June 7, 1932. H. SEELEKE 1,861,723
BRAKING APPARATUS FOR TRAILER VEHICLES
Filed Oct. 24, 1928
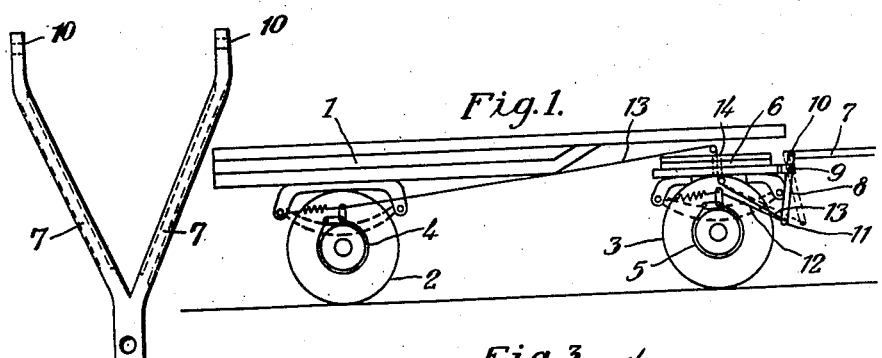
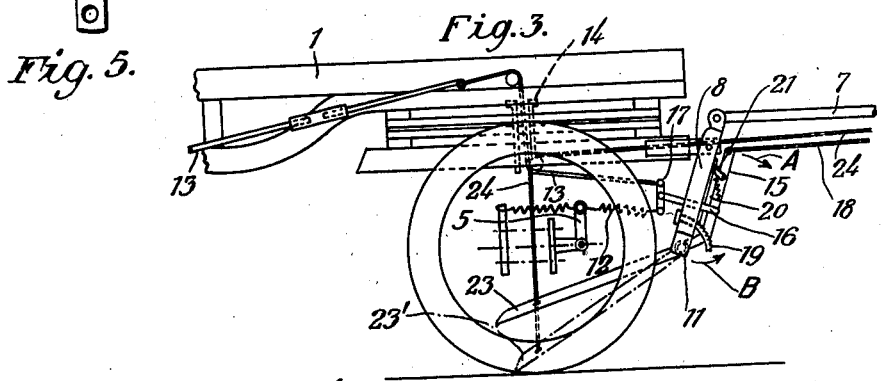
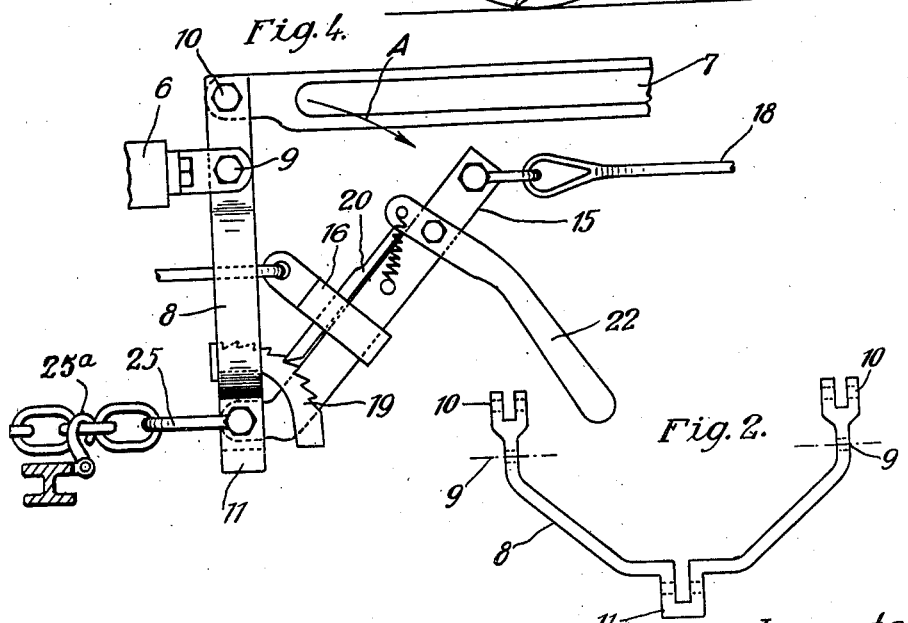
Inventor:
H. Seeleke
By: Marks & Clark
Attys Patented June 7, 1932

1,861,723

UNITED STATES PATENT OFFICE

HEINRICH SEELEKE, OF BREMEN, GERMANY

BRAKING APPARATUS FOR TRAILER VEHICLES

Application filed October 24, 1928, Serial No. 314,835, and in Germany September 9, 1927.

Braking appliances for trailer vehicles are known, in which the front part of the pole or pulling member of the trailer vehicle is displaceably arranged relatively to the rear part of the pole, and during the running up of the trailer on to the tractor vehicle a lever is rocked which acts upon the braking members by means of a tension member or brake rigging. Such an arrangement can only be successfully employed with a pole consisting of a rod, but cannot be directly applied and used in the case of a particularly advantageous forked thill.

If in the case of such an arrangement, with a lever fitted to a rod-shaped pole, the lever is to be rocked by the hand of the driver on the tractor, in order to effect a braking even without the trailer running up on to the tractor, one part of the pole must not be positively connected with the other but must act loosely upon it, and this gives rise to a number of disadvantages. Furthermore the cable for actuating the braking members has to be guided in a complicated manner and it is not possible, without a complicated arrangement of levers, to produce in the brake rigging the tensile force necessary for the braking elements by means of the cable.

Moreover in the known arrangements there is no certainty that in the event of the trailer breaking away from the tractor when climbing a hill, the brake of the trailer will be reliably applied and kept in the braking position.

The present invention obviates these disadvantages, in that the lever acting upon the brake rigging is forked and thus permits of the employment of a particularly advantageous forked pulling member. By the forked arrangement of this lever it is further possible to arrange in a simple manner on this lever a further lever which enables the braking elements to be applied even without rocking the first-mentioned lever, that is, without the trailer running up on to the tractor. The arrangement of the forked lever for the braking elements also permits of an effective and reliable supporting thereof so that a sprag can at the same time be fitted to it, which effects an actuation of the lever for the braking members in the event of the trailer running backwards.

The invention is illustrated by way of example in the accompanying drawing, in which Fig. 1 is a diagrammatic side elevation of a trailer vehicle according to the invention, Fig. 2 is a plan of a detail of Fig. 1 on a larger scale, Fig. 3 is a side elevation of the front portion of a trailer vehicle according to the invention, Fig. 4 is a side elevation of a detail of Fig. 3 on a larger scale and with a slight modification, Fig. 5 is a top plan view of the forked pulling member removed.

In Figure 1, 1 denotes a trailer vehicle with wheels 2 and 3. 4 and 5 represent the braking elements, shown as band brakes. 6 is a turntable on the trailer, and 7 is a forked pole or pulling member.

According to the invention a forked lever 8 is provided as the connection between the pole 7 and the braking members 4 and 5. The lever 8 is pivoted at the points 9 to the turntable and connected by one end at the points 10 to the pole 7. The other end 11 of the forked lever is connected by a tensile member 12 with one brake element 5 and by a tensile member 13 with the other brake element 4, the latter tensile member being passed through the hollow pivot 14 of the turntable.

Fig. 3 shows the right part of Fig. 1 on a larger scale so that the parts, which are omitted in Fig. 1 for the sake of clearness, are also shown. A lever 15 is pivoted at 11 to the lower part of the fork 8. A pulling member 16 engages on the said lever and acts directly or through the medium of a compensating lever 17 and spring 12 on the brake cable 13. The braking members are shown only diagrammatically at 5 in Figure 3. They correspond to the band brake 5 according to Fig. 1. To the free end of the lever 15 is attached a cable 18 which leads to the driver's seat of the tractor or to the preceding trailer.

Figure 4 shows the lever 15 rocked forwardly. In order to keep the lever in the rocked position, a locking device is provided such as a toothed sector 19 and a displaceable detent or pawl 20 subject to spring action. A handle 21 (Fig. 3) or 22 (Fig. 4) is adapted to release the lever from the locked position and to return it to its normal position according to Figure 3. It may extend upwardly, as shown in Fig. 3, or forwardly, as shown in Fig. 4. It is substantially perpendicular to the lever 15.

To the lower end of the lever 8 is pivoted at 11 (Fig. 3) a sprag 23 which is normally kept in the inoperative position by a cord 24 leading to the tractor or to the preceding trailer, as shown in solid or full lines in Figure 3.

To the lower end of the forked lever is preferably fitted an eye 25 (Fig. 4) for the attachment of a chain or the like.

The apparatus operates in the following manner: The forked construction of the lever 8 enables this lever to be supported in a particularly reliable and effective manner at two widely spaced points on the turntable and thereby also enables the lateral forces arising when travelling in a curved path to be effectively transmitted from the pulling member 7 to the turntable.

If the tractor is braked, the trailer runs up owing to the travelling momentum and the pulling member 7 rocks the forked lever 8 on its bearing points 9 so that the lever assumes the position as shown in dotted lines in Figure 1 and pulls the tensile members 12 and 13 which in their turn operate the band brakes 4 and 5.

The cable 18 is provided in order that the brake may be operated even when the vehicle is at a standstill. By pulling the cable, the lever 15 may be rocked in the direction of the arrow A (Fig. 3) so that the braking members of the trailer are brought into the braking position without the lever 8 being rocked. Hence it is possible to apply the brakes of the trailer at any time from the tractor. The cable 18 is secured to the tractor or to the preceding trailer so that upon the trailer breaking away from the tractor or from the preceding trailer, the lever 15 is likewise rocked in the direction of the arrow A and the brakes are applied.

In the event of the trailer breaking away from the tractor or a preceding trailer when climbing a hill, the sprag is adapted to enable the brakes to be reliably applied. If the disconnected trailer begins to run backwards down a hill, the sprag acts upon the lower end of the lever 8 and rocks the latter in the direction of the arrow B (Fig. 3) so that under all circumstances the braking members are actuated and are held fast in the braking position.

If it is desired to travel backwards with the tractor and the attached trailer, the automatic brake would enter into action. In order to avoid this, the chain engaging with the eye 25 is connected to a fixed part of the front wheels such as the axle thereof. The lever 8 cannot then be rocked and act upon the brake as by a hook 25a.

What I claim is:—

1. Braking apparatus for trailer vehicles, consisting of braking elements for the wheels of the trailer, a turntable for the front axle of the trailer, a forked lever pivoted to two different points on the turntable, a forked pole pivotally connected with the upper end of the forked lever, and tensile members connecting the lower end of the forked lever with the braking elements of the wheels.

2. Braking apparatus for trailer vehicles, consisting of braking elements on the wheels of the trailer, a turntable for the front axle of the trailer, a forked, double-armed lever pivoted to two different points on the turntable, a forked pole pivotally connected with one end of the forked lever, a second lever pivoted to the other end of the forked lever, tensile members connecting the said second lever with the braking elements of the wheels, and a cable attached to the free end of the lever and leading to a vehicle in front of the trailer.

3. Braking apparatus for trailer vehicles, consisting of braking elements for the wheels of the trailer, a turntable for the front axle of the trailer, a forked, double-armed lever pivoted to two different points on the turntable, a forked pole pivotally connected with one end of the forked lever, a second lever pivoted to the other end of the forked lever, tensile members connecting the said second lever with the braking elements of the wheels, a cable attached to the free end of the lever and leading to a vehicle in front of the trailer, and a locking device fitted to the second lever and adapted to lock the said second lever in a rocked position.

4. Braking apparatus for trailer vehicles, consisting of braking elements for the wheels of the trailer, a turntable for the front axle of the trailer, a forked, double-armed lever pivoted to two different points on the turntable, a forked pole pivotally connected with one end of the forked lever, a second lever pivoted to the other end of the forked lever, tensile members connecting the said second lever with the braking elements of the wheels, a cable attached to the free end of the lever and leading to a vehicle in front of the trailer, a toothed sector on the forked lever, a resiliently held detent on the second lever, and a handle for operating the resiliently held detent.

5. Braking apparatus for trailer vehicles, consisting of braking elements for the wheels of the trailer, a turntable for the front axle of the trailer, a forked, double-armed lever pivoted to two different points on the turntable, a forked pole pivotally connected with one end of the forked lever, means connecting the other end of the forked lever with the braking elements of the wheels, a sprag pivoted to the last-mentioned end of the forked lever, and a cord attached to the sprag and leading to a vehicle in front of the trailer and normally holding the sprag in a raised position.

6. Braking apparatus for trailer vehicles, consisting of braking elements for the wheels of the trailer, a turntable for the front axle of the trailer, a forked, double-armed lever pivoted to two different points on the turntable, a forked pole pivotally connected with one end of the forked lever, a second lever pivoted to the other end of the forked lever, tensile members connecting the said second lever with the braking elements of the wheels, a cable attached to the free end of the lever and leading to a vehicle in front of the trailer, a locking device fitted to the second lever and adapted to lock the said second lever in a rocked position, a sprag pivoted to the lower end of the forked lever, a cord attached to the sprag and leading to a vehicle in front of the trailer and normally holding the sprag in a raised position.

In testimony whereof I have signed my name to this specification.

HEINRICH SEELEKE.